United States Patent
Rhim et al.

(10) Patent No.: US 7,539,124 B2
(45) Date of Patent: May 26, 2009

(54) APPARATUS AND METHOD FOR SETTING ROUTING PATH BETWEEN ROUTERS IN CHIP

(75) Inventors: Sang-woo Rhim, Seoul (KR); Beom-hak Lee, Seoul (KR); Jae-kon Lee, Suwon-si (KR); Eui-seok Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 756 days.

(21) Appl. No.: 10/998,571

(22) Filed: Nov. 30, 2004

(65) Prior Publication Data
US 2005/0185642 A1    Aug. 25, 2005

(30) Foreign Application Priority Data
Feb. 6, 2004    (KR) ............. 10-2004-0007721

(51) Int. Cl.
  H04J 11/00    (2006.01)
  H04L 12/28   (2006.01)
(52) U.S. Cl. .............. 370/208; 370/351; 370/389
(58) Field of Classification Search .......... 370/208, 370/335, 351, 389, 392
See application file for complete search history.

(56) References Cited

U.S. PATENT DOCUMENTS

| | | | |
|---|---|---|---|
| 4,797,882 A | | 1/1989 | Maxemchuk ............. 370/94 |
| 5,896,368 A | * | 4/1999 | Dahlman et al. ........... 370/335 |
| 6,912,196 B1 | * | 6/2005 | Mahalingaiah ............. 370/216 |
| 7,095,707 B2 | * | 8/2006 | Rakib et al. .................. 370/204 |
| 7,116,650 B2 | * | 10/2006 | Takeuchi et al. ............ 370/329 |
| 2001/0020917 A1 | * | 9/2001 | Hamada et al. ............. 342/442 |
| 2007/0115798 A1 | * | 5/2007 | Sobelman et al. ........... 370/208 |

FOREIGN PATENT DOCUMENTS

CA      2261556      8/1999

OTHER PUBLICATIONS

Ni, L. et al., "A Survey of Wormhole Routing Techniques in Direct Networks," Computer, IEEE Computer Society, Feb. 26, 1993, No. 2, pp. 62-76.
Ding, J. et al., "ATM Switch Design Using Code Division Multiple Access Techniques," IEEE International Symposium on Circuits and Systems, May 28-31, 2000, vol. 1, pp. I379-I382.

(Continued)

*Primary Examiner*—Hong Cho
(74) *Attorney, Agent, or Firm*—Staas & Halsey LLP (57) ABSTRACT

An apparatus and a method for setting a routing path in System-on-a-Chip (SoC) having an n×n net topology-based structure comprising a plurality of intellectual properties (IPs), each with a unique address, and a plurality of switches forming one-to-one correspondence to the IPs, to transmit and receive data between the IPs by using at least one of the switches. Accordingly, an orthogonal code having orthogonality is assigned according to the direction of transmission of each data (that is, output port). Then, an output port where the data is transmitted is determined, and the data is spread based on an orthogonal code assigned to the output ports of the at least one of the switches.

24 Claims, 6 Drawing Sheets

OTHER PUBLICATIONS

Lin, X. et al., "Deadlock-Free Multicast Wormhole Routing in 2-D Mesh Multicomputers," IEEE Transactions on Parallel and Distributed Systems, Aug. 5, 1994, No. 8, pp. 793-804.

Pande, P. et al., "High-Throughput Switch-Based Interconnect for Future SoCs," Proceedings of the 3rd IEEE International Workshop on System-on-Chip for Real-Time Applications, Jul. 2003.

Zeferino, C. et al., "SoCIN: A Parametric and Scalable Network-on-Chip," Proceedings of the 16th IEEE Symposium on Integrated Circuits and Systems Design, Sep. 8, 2003, pp. 169-174.

Kochte, M. et al., "Packet-Switching Networks on Systems-on-a-Chip," INET, Jun. 12, 2003, http:\ www.ra.informatik.uni-stuttgart.de/{tangyi/noc/noc-packet-switched-networks.pdf.

Kim, J. et al., "A 2-Gb/s/pin Source Synchronous CDMA Bus Interface with Simultaneous Multi-Chip Access and Reconfigurable I/O Capability," Proceedings of the IEEE 2003 Custom Integrated Circuits Conference, San Jose, CA, Sep. 21, 2003, pp. 317-320.

Pande, P. P. et al., "High-Throughput Switch-Based Interconnect for Future SoCs," 3rd IEEE Int'l Workshop on System-on-Chip for RealTime Applications, Jul. 2003.

Zeferino, C.A. et al., "SoCIN: A Parametric and Scalable Network-on-Chip," 16th Symposium on Integrated Circuits and Systems Design, Sep. 8-11, 2003, pp. 169-174, Piscataway, NY.

Ding, J. et al., "ATM Switch Design Using Code Division Multiple Access Techiques," IEEE Int'l Symposium on Circuits and Systems, May 28-31, 2000, pp. I379-I382, Piscataway, NY.

Kochte, M., "Packet-Switching Networks on Systems-on-a-Chip," INET, 'Online!,' Jun. 12, 2003.

Kim, J. et al., "A 2-Gb/s/pin Source Synchronous CDMA Bus Interface with Simultaneous Multi-Chip Access and Reconfigurable I/O Capability," IEEE 2003 Custom Integrated Circuits Conference, 2003, pp. 317-320, New York, NY.

\* cited by examiner

FIG. 7 though the switch S5 determined the
priority in order of the S1, S4, S6, and S9. However, it is to be
understood that other priorities are possible.

APPARATUS AND METHOD FOR SETTING ROUTING PATH BETWEEN ROUTERS IN CHIP

CROSS-REFERENCE TO RELATED APPLICATIONS

This application claims benefit under 35 U.S.C. § 119 from Korean Patent Application No. 2004-7721 filed on Feb. 6, 2004, the disclosure of which is incorporated herein by reference.

BACKGROUND OF THE INVENTION

1. Field of the Invention

The present invention relates in general to a System-on-a-Chip (SoC), more particularly, to an apparatus and a method for setting a routing path between routers in a chip.

2. Description of the Related Art

To facilitate Internet access or computing functions of digital data equipment like cell phones, PDAs (Personal Digital Assistants), digital TVs, and smart phones, a number of semiconductor chips including a microprocessor, a network chip, and a memory are required. As the data equipment has become more complicated, integration among these products is already occurring and will become a necessity in the near future. If that happens, even more chips will be required within one single data device.

Developed as an answer to the above is a System-on-a-Chip (SoC) technology which integrates features of every component (even semiconductors) on a single chip. In general, the SoC system is constructed of a computing element, input and output (I/O), logic, and memory. The compact and high-integration SoC features high performance and low power consumption, so a majority of data equipment will benefit from the SoC technology. Intellectual property (IP) is also used to help designers to create the semiconductor chip much more rapidly. The IP is a design block that is specially developed as a ready-to-use application to the single chip.

Many studies on the SoC are in progress. In particular, a scheme for connecting IPs built in a chip is considered very important. For example, a bus architecture and a network architecture are currently used to connect IPs. Unfortunately however, the bus architecture already exposed its limit as the amount of data transmitted/received between IPs increases. This is because when a specific IP uses a bus, and other IPs cannot use the bus at all. That is, the bus is exclusively used for the specific IP.

Moreover, the bus architecture is not extendable but fixed, so that additional IPs of the chip cannot be connected to a bus. As an attempt to solve the performance drawback of the bus architecture, the network architecture is devised to connect IPs. The network architecture, compared to the bus structure, consumes less power. Hereinafter, the network architecture for the SoC will be called 'NoC' (Network-on-Chip).

Figure 1:
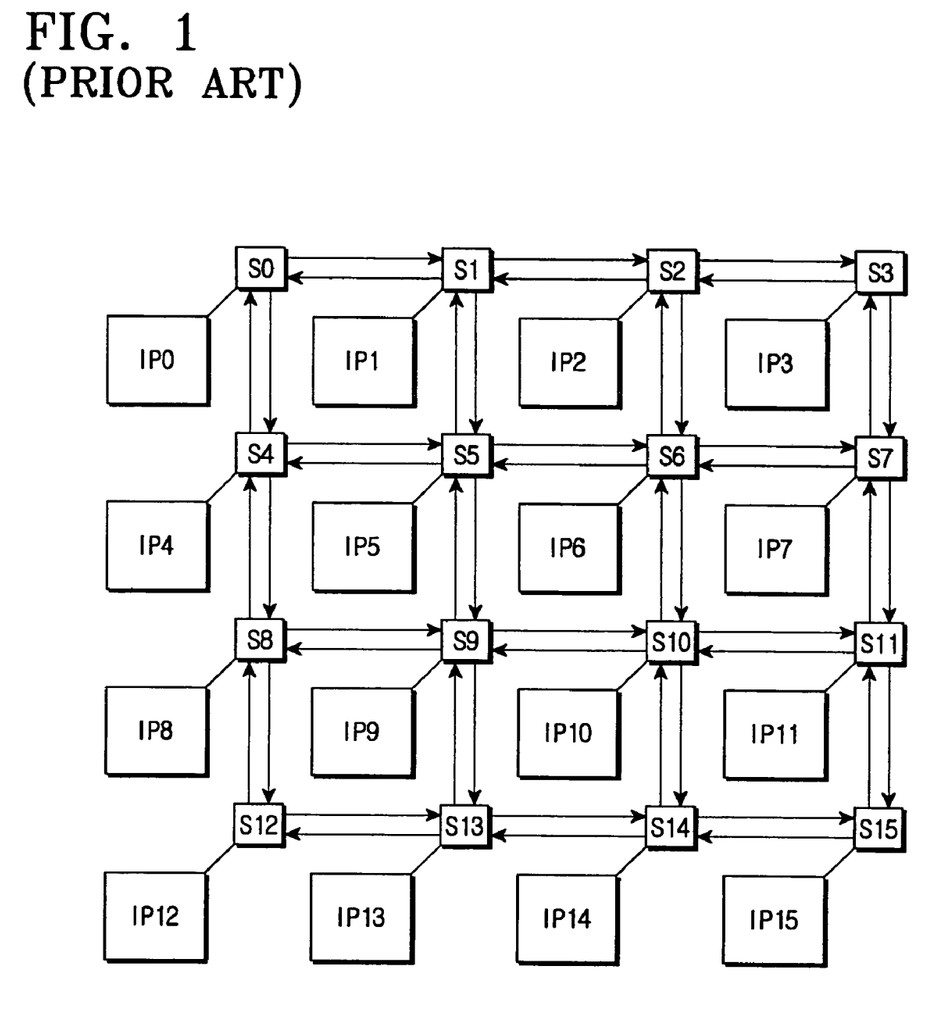
FIG. 1 illustrates a conventional SoC having an n×n net topology-based structure.

FIG. 1 illustrates a chip architecture using n x n net topology according to an embodiment of the present invention. The chip network architecture using n×n net topology will now be explained in detail with reference to FIG. 1. Particularly, FIG. 1 illustrates a 4×4 net topology. As shown in FIG. 1, the NoC includes a plurality of IPs and switches S corresponding to respective IPs. In other words, there is a one-to-one correspondence between the IPs and the switches. Each switch is interconnected to adjacent switches, and receives data from those adjacent switches. If the destination address of the transferred data is identical with the address of a switch, the data is transferred to an IP connected to the switch. However, if the destination address of the transferred data is not identical with the address of the switch, the data is retransmitted back to the adjacent switch.

It is assumed that a switch S5 generates data to be transferred to at least two adjacent switches at a certain point. The data is directly generated by the IP5 or is transferred from adjacent switches. For instance, provided that the switch S5 generates data to be transferred to the switches, S1, S4, S6, and S9, the S5 determines the priority of the data to be transferred to the adjacent switches. A user can change the priority as desired. For example, the priority levels can be designated according to data capacity. For convenience of explanation, it is assumed that the switch S5 determined the priority in order of the S1, S4, S6, and S9. However, it is to be understood that other priorities are possible.

The S5 transfers the data to the adjacent switches according to the priority. That is, the S5 transfers the data to the S1 first since it has the highest priority, and lastly to the S9 having the lowest priority. If there is data which is not transferred in real time mode (that is, low priority data), such data is stored in a buffer of the S5 to prevent the data loss.

Still a problem arises that under the NoC environment, the transmission of 100 packets per buffer is not possible. If the buffer is to transmit 100 packets of data as the existing network does, the buffer size will have to be increased also. If the buffer size increases, the chip size should be increased accordingly, and as a result of this, the SoC loses its own function. Moreover, as the number of IPs constructing one chip increases, the number of data packets being transmitted and received increases as well. The increase in data packets to be transmitted and received also causes problems including an increase in the buffer size, an increase in the complexity of a chip, and delay in data transfer.

SUMMARY OF THE INVENTION

It is, therefore, an aspect of the present invention is to provide an apparatus and a method transferring corresponding data to adjacent switches in real-time mode by shortening storage time of a buffer for data to be transferred.

Another aspect of the present invention is to provide an apparatus and a method for reducing the size of SoC by reducing the amount of data stored in the buffer.

Still another aspect of the prevent invention is to provide an apparatus and a method for improving data reliability by reducing data distortion and data loss for the data to be transferred to adjacent switches.

Yet another aspect of the present invention is to provide a method for transferring corresponding data to adjacent switches by adopting code division method instead of TDM.

According to an aspect of the present invention, there is provided a method of setting a routing path in a System-on-a-Chip (SoC) including a plurality of intellectual properties (IPs), each IP being connected to at least one switch and having a unique address, to transmit and receive data between the IPs using at least one of the switches, including: assigning an orthogonal code featuring mutual orthogonality for each IP; spreading the data, via a destination IP, by using an assigned orthogonal code when the data is transmitted; and broadcasting the spread data to the IPs using at least one of the switches.

Another aspect of the present invention provides a method of setting a routing path in System-on-a-Chip (SoC) having an n×n net topology-based structure including a plurality of intelligent properties (IPs), each with a unique address, and a plurality of switches in one-to-one correspondence to the IPs, to transmit and receive data between the IPs using at least one of the switches, including: assigning an orthogonal code featuring orthogonality according to an output port of each data; and determining an output port to which data is to be transmitted and spreading the data using an orthogonal code assigned to the output port.

Still another aspect of the present invention provides an apparatus for setting a routing path in a System-on-a-Chip (SoC) including a plurality of intellectual properties (IPs), each IP being connected to at least one switch and having a unique address, to transmit and receive data between the IPs by using at least one of the switches, including: an intellectual property (IP) which spreads transferred data by using assigned orthogonal codes having mutual orthogonality; and switches which receive the spread data and which broadcast the data to the IPs.

Yet another aspect of the present invention provides an apparatus for setting a routing path in System-on-a-Chip (SoC) having an n×n net topology-based structure including a plurality of intellectual properties (IPs), each with a unique address, and a plurality of switches forming one-to-one correspondence to the IPs, to transmit and receive data between the IPs by using at least one of the switches, including: a routing path setting unit which determines an output to which data is transmitted; and spreaders which receive the data and spreading the data using assigned orthogonal codes corresponding to output ports of the at least one of the switches.

Still another aspect of the present invention provides a method of shortening transmission time in a System-on-a-Chip (SoC) including a plurality of intellectual properties (IPs) to transmit and receive data between the IPs using at least one switch, including: comparing a destination address included in data to be transmitted by a switch with a switch address of the switch; transferring the data to an IP connected to the switch when the destination address and the switch address are determined to be the same; calculating a value using a modulo operation when the destination address and the switch address are determined not to be the same; setting a routing path (port) of the data to be transmitted after the calculating; spreading the data by using an orthogonal code assigned to the set port; transferring the spread data to all of the ports of the switch; despreading the transferred data via each of the ports by using an orthogonal code assigned to each of the ports; and transferring the despread data to adjacent switches.

Yet another aspect of the present invention provides a method of setting a routing path so as to reduce a buffer size, including: calculating a difference of the destination address and the source address; determining whether a first condition is satisfied and setting a routing path of the data to a first side when it is determined that the first condition is satisfied; determining whether a second condition is satisfied when the first condition is determined not to be satisfied and setting the routing path of data to a second side when the second condition is determined to be satisfied; determining whether a third condition is satisfied when the second condition is not satisfied and setting the routing path of data to a third side when the third condition is determined to be satisfied; and setting the routing path of data to a fourth side.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
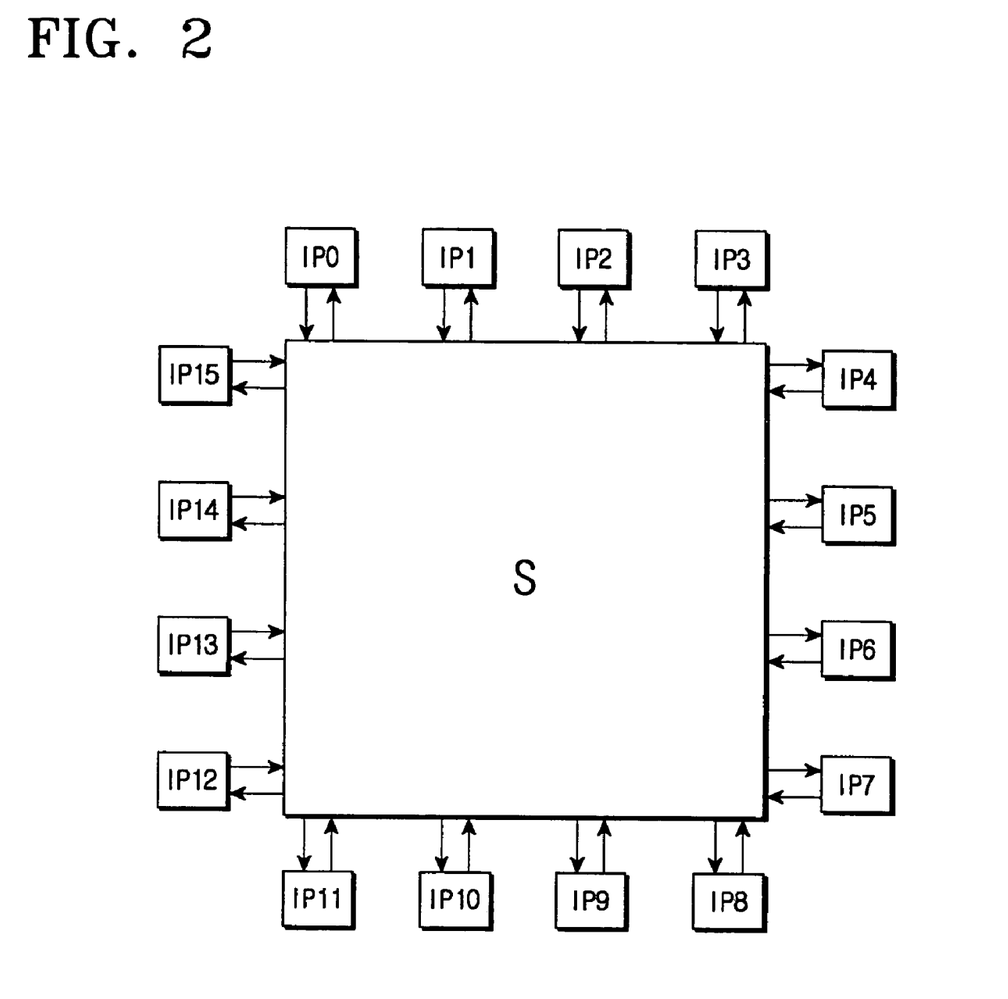
FIG. 2 illustrates a SoC having a star topology-based structure for transmitting and receiving data based on the code division method according to an embodiment of the present invention.

FIG. 2 schematically illustrates transmitting and receiving data to and from adjacent IPs, based on a code division method according to an embodiment of the present invention. In particular, FIG. 2 shows a star topology where at least two IPs share one switch. For example, in FIG. 2, 16 IPs IP1, IP2, IP3, . . . , IP16 share one switch. Each IP is assigned to its own address. Hereinafter, the assigned IP address and IP( ) will be used with the same meaning throughout the specification. Each IP is assigned with an orthogonal code. The following <Table 1>lists IPs and their assigned orthogonal codes.

TABLE 1

| IP address | Orthogonal Code |
| --- | --- |
| IP(0) | 0000 0000 0000 0000(w0) |
| IP(1) | 0101 0101 0101 0101(w1) |
| IP(2) | 0011 0011 0011 0011(w2) |
| IP(3) | 0110 0110 0110 0110(w3) |
| IP(4) | 0000 1111 0000 1111(w4) |
| IP(5) | 0101 1010 0101 1010(w5) |
| IP(6) | 0011 1100 0011 1100(w6) |
| IP(7) | 0110 1001 0110 1001(w7) |
| IP(8) | 0000 0000 1111 1111(w8) |
| IP(9) | 0101 0101 1010 1010(w9) |
| IP(10) | 0011 0011 1100 1100(w10) |
| IP(11) | 0110 0110 1001 1001(w11) |
| IP(12) | 0000 1111 1111 0000(w12) |
| IP(13) | 0101 1010 1010 0101(w13) |
| IP(14) | 0011 1100 1100 0011(w14) |
| IP(15) | 0110 1001 1001 0110(w15) |

Each IP stores the data shown in <Table 1>. The address of an IP generating data to be transferred is called "source address," and the address of an IP where data is eventually transmitted is called "destination address." For instance, it is assumed that IP(0) generated data to be transferred to IP(3), and IP(6) generated data to be transferred to IP(9). The IP(0) spreads the data employing an orthogonal code assigned to the IP(3). Then, the IP(0) transfers the spread data to the shared switch "S". Similarly, the IP(6) spreads the data employing an orthogonal code assigned to the IP(9), and later transfers the spread data to the switch. The switch adds the transferred data, and broadcasts them to adjacent IPs. That is, the switch transfers the data being added to IP(0) to IP(15).

Using the assigned orthogonal codes, the IP(0) to IP(15) despread the transferred data. Performing the despreading process, the IP(3) receives data from the IP(0), and the IP(9) receives data from the IP(6), respectively. Therefore, the code division method makes it possible for the switch to transmit a lot of data at the same point.

Figure 3:
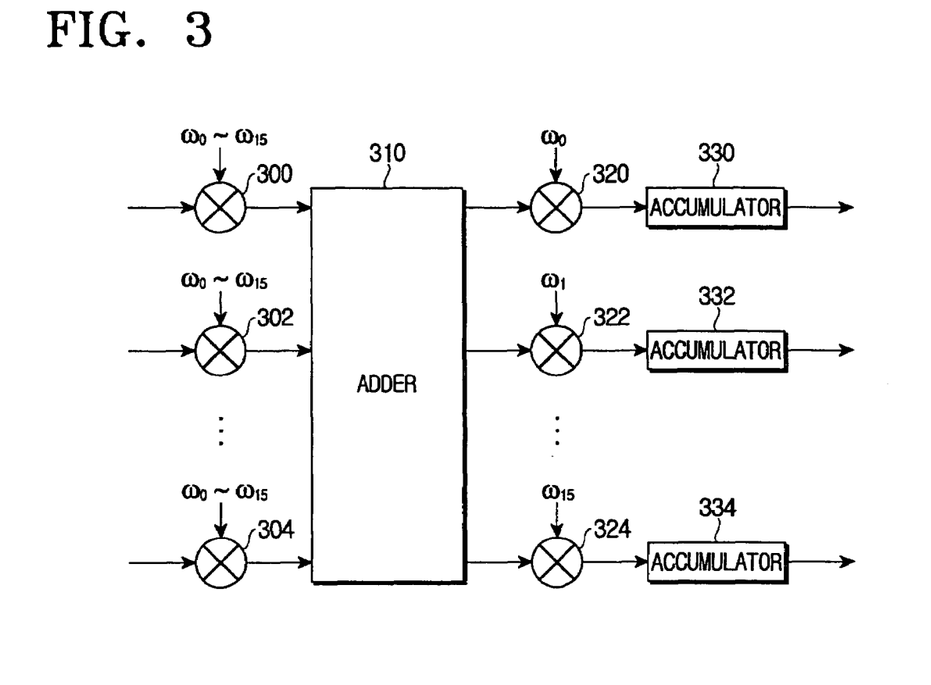
FIG. 3 illustrates a data switching process based on the code division method of FIG. 2.

FIG. 3 illustrates a data switching process based on the code division method. In particular, FIG. 3 illustrates an NoC constructed of 16 IPs. The NoC based on code division will now explained in detail with reference to FIG. 3.

A spreader 300 receives data and an IP for transferring the data. The spreader 300 also receives an orthogonal code assigned to the IP for transferring the data. In other words, the spreader 300 receives an orthogonal code out of w(0) to w(15), which is specially assigned to the IP for transferring the data. Then, the spreader 300 spreads the data by using the orthogonal code, and transfers it to an adder 310. The other spreaders 302 to 304 also perform the same process as the spreader 300.

The adder 310 adds the transferred data and transfers them to the despreaders 320 to 324. The despreader 320 despreads the transferred data by using its assigned orthogonal code w(0), and transfers it to an accumulator 330. Then, the accumulator 330 accumulates the transferred data. In such a manner, the despreader 322 despreads the transferred data by using its assigned orthogonal code w(1), and transfers it to an accumulator 332. Then, the accumulator 332 accumulates the transferred data. The despreader 324 despreads the transferred data by using its assigned orthogonal code w(15), and transfers it to an accumulator 334. Then, the accumulator 334 accumulates the transferred data. By checking the accumulated data in the accumulators 330 to 334, a user is able to find out whether the data have been received.

The data is transmitted to the IP that uses the same orthogonal code as the one used by the spreader, and if the IP uses a different orthogonal code from the one used by the spreader, the IP cannot receive the data. This is because of the nature of the orthogonal code having no correlation between codes.

One drawback of the star topology-based structure illustrated in FIG. 2 is that the length of orthogonal code assigned to each IP increases in proportion to the number of IPs. To overcome this problem, a suggestion is made to assign an orthogonal code to the NoC having the net topology-based structure shown in FIG. 1, in order to transfer data. As depicted in FIG. 1, each switch can set a routing path with up to four adjacent switches. The following will, therefore, explain how to assign an orthogonal code according to each path as shown in FIG. 2.

Figure 4:
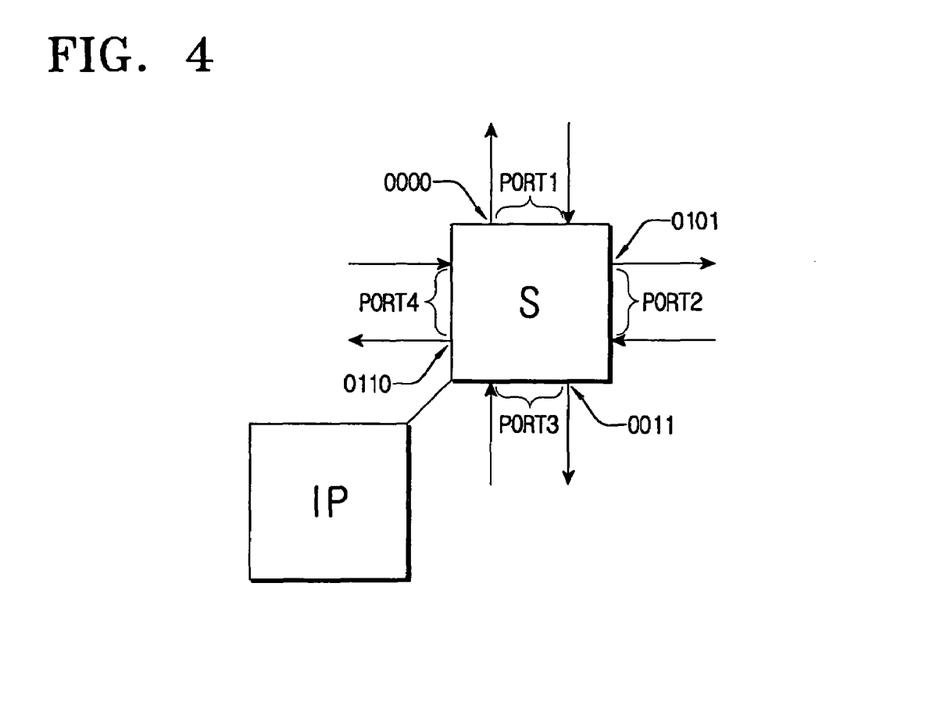
FIG. 4 illustrates a code division-based switch for use in a SoC having a net topology-based structure according to an embodiment of the present invention.

FIG. 4 illustrates assigning an orthogonal code according to each path, according to an embodiment of the present invention. As described above, a switch in the net topology-based structure can set a routing path with up to four adjacent switches. Therefore, four orthogonal codes are required for the NoC having the net topology-based structure. At this time, the number of orthogonal codes is maintained constant regardless of the increase in the number of IPs. The following <Table 2>illustrates allocated orthogonal codes per path (direction, output port).

TABLE 2

| Switching direction | Allocated orthogonal code |
|---|---|
| Up (North) | 0000 |
| Down (South) | 0101 |
| Left (West) | 0011 |
| Right (East) | 0110 |

As shown in the <Table 2>, the orthogonal code has a fixed length no matter how many IPs exist. Each switch included in the NoC stores the same data as shown in the <Table 2>. Described next is a method for transmitting data from an IP having a source address to an IP having a destination address, on the basis of the <Table 2>.

Figure 5:
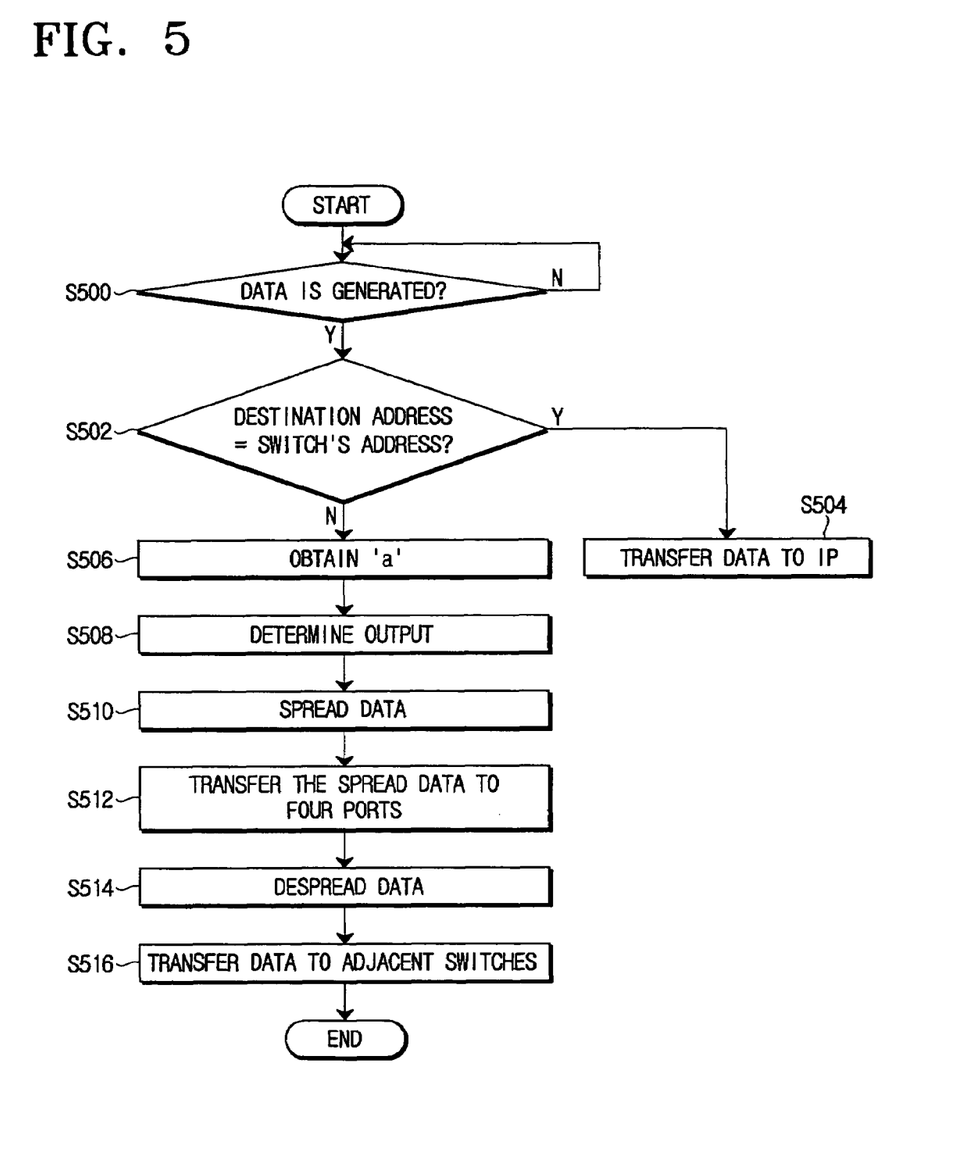
FIG. 5 illustrates an operation performed by a switch included in a SoC according to an embodiment of the present invention.

FIG. 5 is a flowchart illustrating the operations conducted by the switch of the present invention. With concurrent reference to FIGS. 4 and 5, there are four ports, each port with a despreader for despreading data by using its assigned orthogonal code. The switch performs operations as follows.

First, the switch determines whether there is data to be transmitted at operation S500. If the data to be transmitted has been generated, the switch proceeds with the next operation. However, if the data to be transmitted has not been generated, the switch does not proceed with the next operation but instead repeats operation S500. In operation 502, the switch compares the destination address included in the received data with its own address. If it turns out that the destination address is in coincidence with its own address (i.e., the same), the switch proceeds with operation 504, but if the addresses are not coincident with each other, the switch proceeds with operation 506. In operation 504, the switch transfers the transmitted data to an IP connected to the switch.

In operation 506, the switch calculates a value "a." The "a" can be obtained from the following <Equation 1>, using source address and "n" values. Hereinafter, the address of an IP connected to the switch conducting the procedure of FIG. 5 will be referred to as the "source address," while the address of an IP that actually generated data to be transferred will be referred to as an "original source address."

$$a = \text{source address} \% \ n. \qquad [\text{Equation}]1$$

In Equation 1, % indicates a modulo operation. For example, provided that the source address is 2 and n equals to 4, a=2% 4=2. After obtaining the value, the switch sets a routing path (port) of the data being generated at operation S508. This operation will be explained below in more detail. Then, the switch spreads the data by using an orthogonal code assigned to the port at operation S510. The spread data is transferred to four ports of the switch at operation S512. Each port despreads the transferred data by using its assigned orthogonal code at operation S514. Lastly, each port transfers the despread data to adjacent switches at operation S516.

As described above with reference to FIG. 5, the switch includes one spreader and four despreaders. Data spreading is performed by the spreader built in the switch, and data despreading is respectively performed by those four ports disposed outside the switch. Therefore, the switch transmits data to only one port out of the four. That is, only the port using the same orthogonal code with the one used by the spreader transmits the data. The data from the port includes information about the original source address and the destination address.

Figure 6:
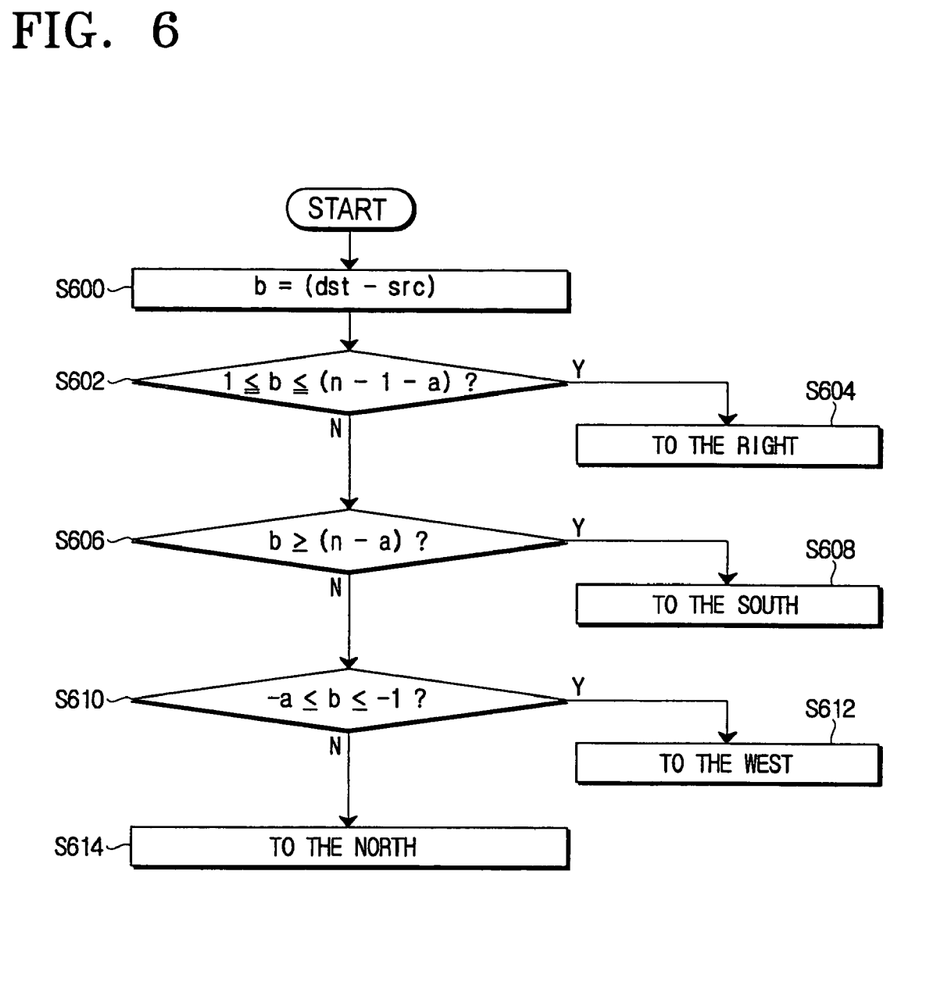
FIG. 6 illustrates a procedure for setting a routing path (output port) of data by a switch according to an embodiment of the present invention.

FIG. 6 illustrates a procedure for setting a routing path of data according to an embodiment of the present invention. At first, a switch obtains a difference (b) of the destination address (dst) and the source address (src) (S600). For example, provided that the source address is 2 and the destination address is 9, b=9−2=7. Then, the switch determines whether a condition $1 \leq b \leq (n-1-a)$ is satisfied at operation S602. If the condition is satisfied, the switch proceeds with the next operation 604, but if the condition is not satisfied, the switch proceeds with the operation 606. In operation 604, the switch sets a routing path of the data to the right side (east). The switch determines whether a condition $b \leq (n-a)$ is satisfied at operation 606. If the condition is satisfied, the switch proceeds with operation 608, but if not, the switch proceeds with operation 610. In operation 608, the switch sets the routing path of data to downward (south). In operation 610, the switch determines whether a condition $-a \leq b \leq -1$ is satisfied. If the condition is satisfied, the switch proceeds with operation 612, but if not, the switch proceeds with operation 614. In operation 612, the switch sets the routing path of data to the left side (west). The switch sets the routing path of data to upward (north) at operation 614.

For example, it is assumed that the source address is 2 and the destination address is 9, and n=4. Then, the switch sets the routing path of data to downward (south). Therefore, the switch spreads the data by using an orthogonal code assigned to the south, and the spread data is transferred to those four ports, respectively. Each port despreads the transmitted data. In this manner, only the port in the south can generate data and transfer the data.

Although it is assumed that data is transmitted and received in the embodiments of FIGS. 5 and 6, there are some cases where at least two data having different destination addresses are generated in the switch. If this is the case, the switch performs the procedures of FIGS. 5 and 6 on each data. To this end, the switch should spread each data at the same point. This explains why the number of data packets and the number of spreaders should be same. For instance, it is assumed that the routing path of a first data is directed to the east and the routing path of a second data is directed to the south. In this case, the switch spreads the first data by using an orthogonal code assigned to the east, and spreads the second data by using an orthogonal code assigned to the south. The switch then adds the spread data and transfers them to those four ports. Each port despreads the transmitted data, respectively. Performing the despreading process, the port of the east generates the first data, and the port of the south generates the second data. Thusly generated data are transferred to adjacent switches, respectively.

Figure 7:
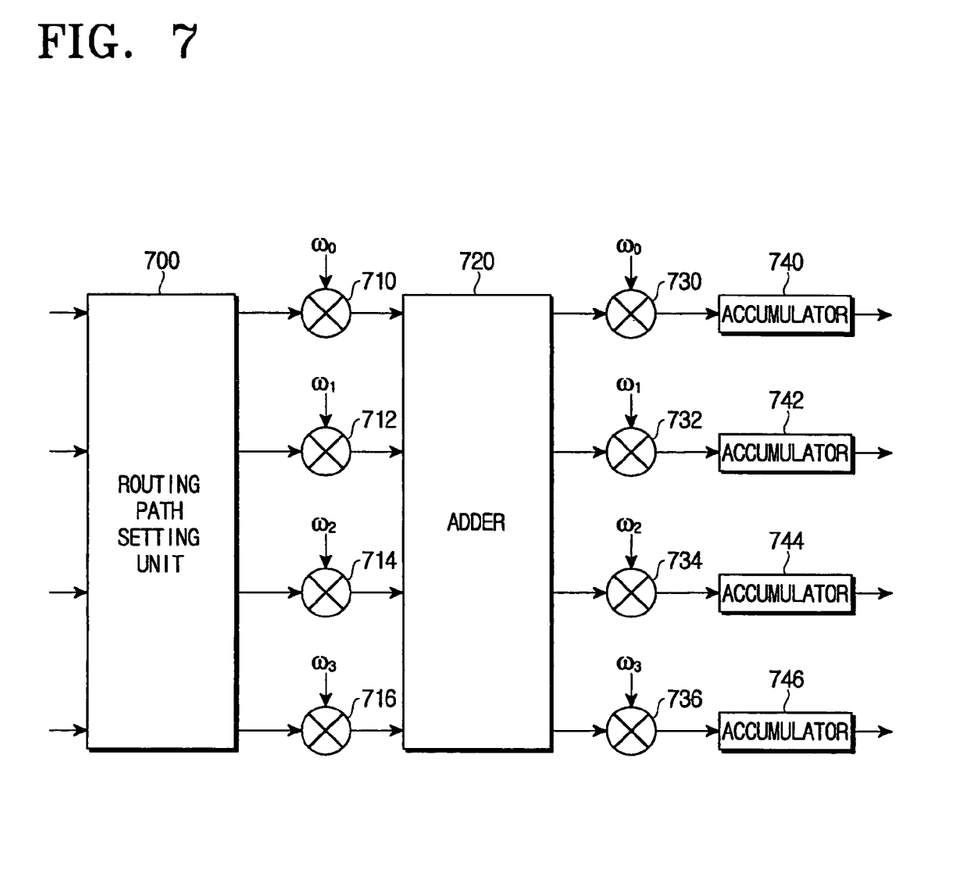
FIG. 7 illustrates the structure of a switch according to an embodiment of the present invention.

FIG. 7 illustrates the operation performed by the switch of an embodiment of the present invention. In FIG. 3, the IP performed the data spreading and despreading processes, but in FIG. 7, the switch performs the data spreading and despreading processes.

Since the switch can receive data from four ports, it has four spreaders, as shown in FIG. 7. Each port includes an input port and an output port. The data input to at least one input port is transferred to a routing path setting unit 700. Although in this embodiment the routing path setting unit 700 receives data from the four input ports, the number of input ports transferred to the routing path setting unit 700 can be varied, depending on the SoC.

The routing path setting unit 700 uses the destination address included in the transferred data and its own address to determine an output port where the data needs to be transferred. If the destination address and its own address are same, the switch transfers the transferred data to the IR The procedure involved in the determination of the output port by the routing path setting unit 700 is similar to the procedure described referring to FIG. 4. If an output port 1 is chosen, the routing path setting unit 700 transfers the data to a spreader 710. In such a manner, if an output port 2 is chosen, the routing path setting unit 700 transfers the data to a spreader 712. If an output port 3 is chosen, the routing path setting unit 700 transfers the data to a spreader 714. Lastly, if an output port 4 is chosen, the routing path setting unit 700 transfers the data to a spreader 716.

The spreader 710 spreads the transferred data by using an orthogonal code w0 and transfers it to the adder 720. In such a manner, the spreader 712 spreads the transferred data by using an orthogonal code w1, and transfers it to the adder 720. The spreader 714 spreads the transferred data by using an orthogonal code w2, and transfers it to the adder 720. Lastly, spreader 716 spreads the transferred data by using an orthogonal code w3, and transfers it to the adder 720. Then, the adder 720 performs the adding process on the spread data.

After adding the data, the adder 720 transfers the data to the despreaders 730 to 736, respectively. The despreader 730 despreads the transferred data by using the orthogonal code w0, and transfers it to an accumulator 740. Similarly, the despreader 732 despreads the transferred data by using the orthogonal code w1, and transfers it to an accumulator 742. Also, the despreader 734 despreads the transferred data by using the orthogonal code w2, and transfers it to an accumulator 744. Lastly, the despreader 736 despreads the transferred data by using the orthogonal code w3, and transfers it to an accumulator 746. After accumulating the data, each of the accumulators 740 to 746 transfers the data to adjacent switches via a corresponding output port.

Every output port can output data, but only the output port(s) chosen by the routing path setting unit 700 actually outputs data. For example, if the routing path setting unit 700 chooses the output port 0 and the output port 1, only the output ports 0 and 1 output data.

In conclusion, the code division-based routing setting can be advantageously used for reducing the size of the buffer included in the switch. Moreover, by setting the data routing path by using the orthogonal code, it is possible to shorten transmission time. Therefore, no matter how many IPs are used for constructing the SoC, the orthogonal code can be maintained at constant length.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of setting a routing path in a System-on-a-Chip (SoC) including a plurality of intellectual properties (IPs), each IP being connected to at least one switch and having a unique address, to transmit and receive data between the IPs using at least one of the switches, comprising:

assigning an orthogonal code featuring mutual orthogonality for each IP;

spreading the data, via a destination IP, by using an assigned orthogonal code when the data is transmitted; and broadcasting the spread data to the IPs using at least one of the switches, wherein the data includes a source address of the IP where the data is generated, and a destination address of the data, and wherein the data is spread when the destination address is not the same as an address of a switch that receives the data.

2. The method according to claim 1, wherein IPs which receive the spread data despread the spread data, respectively, using assigned orthogonal codes.

3. The method according to claim 1, wherein the SoC has a star topology-based structure.

4. The method according to claim 1, wherein the SoC has a net topology-based structure.

5. A method of setting a routing path in System-on-a-Chip (SoC) having an n×n net topology-based structure including a plurality of intellectual properties (IPs), each with a unique address, and a plurality of switches in one-to-one correspondence to the IPs, to transmit and receive data between the IPs using at least one of the switches, comprising:
   assigning an orthogonal code featuring orthogonality according to an output port of each data; and
   determining an output port to which data is to be transmitted and spreading the data using an orthogonal code assigned to the output ports,
   wherein the data includes a source address of the IP where the data is generated, and a destination address of the data, and
   wherein the data is spread when the destination address is not the same as an address of a switch that receives the data.

6. The method according to claim 5, comprising transferring the spread data to corresponding output ports and despreading the transferred data using the orthogonal code assigned to each output port.

7. The method according to claim 5, wherein the determination of the output port includes:
   obtaining a modulo value with respect to the address of the switch by using a modulo ("n") and a difference between the destination address and the address of the switch; and
   determining the output of the data on the basis of the modulo value and the difference.

8. The method according to claim 5, wherein at least two data are spread at one point, and the spread data are added and then transferred to the output port.

9. An apparatus for setting a routing path in a System-on-a-Chip (SoC) including a plurality of intellectual properties (IPs), each IP being connected to at least one switch and having a unique address, to transmit and receive data between the IPs by using at least one of the switches, comprising:
   an intellectual property (IP) which spreads transferred data by using assigned orthogonal codes having mutual orthogonality; and
   switches which receive the spread data and which broadcast the data to the IPs,
   wherein the data includes a source address of one of the IPs where the data is generated, and a destination address of the data, and
   wherein the one IP spreads the data when the destination address is not the same as the address of the one IP.

10. The apparatus according to claim 9, wherein the IPs despread the broadcast data using assigned orthogonal codes.

11. The apparatus according to claim 9, wherein the SoC has a star topology-based structure.

12. The apparatus according to claim 9, wherein the SoC has a net topology-based structure.

13. An apparatus for setting a routing path in System-on-a-Chip (SoC) having an n×n net topology-based structure including a plurality of intellectual properties (IPs), each with a unique address, and a plurality of switches forming one-to-one correspondence to the IPs, to transmit and receive data between the IPs by using at least one of the switches, comprising:
   a routing path setting unit which determines an output to which data is transmitted; and
   spreaders which receive the data and spread the data using assigned orthogonal codes corresponding to output ports of the at least one of the switches,
   wherein the data includes a source address of one of the IPs where the data is generated, and a destination address of the data, and
   wherein the one IP spreads the data when the destination address is not the same as the address of the one IP.

14. The apparatus according to claim 13, comprising an adder which adds data transferred from at least two spreaders and which transfers the data to corresponding output ports, respectively.

15. The apparatus according to claim 14, wherein each output port includes a despreader which despreads the data transferred from the adder using orthogonal codes.

16. The apparatus according to claim 13, wherein the routing path setting unit obtains a modulo value with respect to the address of the switch and a difference between the destination address and the address of the switch by using the number of ports (n); and determines the output of the data on the basis of the modulo value and the difference.

17. A method of shortening transmission time in a System-on-a-Chip (SoC) including a plurality of intellectual properties (IPs) to transmit and receive data between the IPs using at least one switch, comprising:
   comparing a destination address included in data to be transmitted by a switch with a switch address of the switch
   transferring the data to an IP connected to the switch when the destination address and the switch address are determined to be the same;
   calculating a value using a modulo operation when the destination address and the switch address are determined not to be the same;
   setting a routing path (port) of the data to be transmitted after the calculating;
   spreading the data by using an orthogonal code assigned to the set port;
   transferring the spread data to all ports of the switch;
   despreading the transferred data via each of the ports by using an orthogonal code assigned to each of the ports; and
   transferring the despread data to adjacent switches.

18. The method of claim 17, wherein each IP is connected to at least one switch and has a unique address.

19. The method of claim 17, wherein the switch includes 4 ports.

20. The method of claim 19, wherein the four ports are disposed outside the switch.

21. The method of claim 19, wherein the switch transmits data to only one port out of the four.

22. The method of claim 21, wherein only the port using the same orthogonal code with the one used by the spreader transmits the data.

23. The method of claim 22, wherein the data from the port includes information about the original source address and the destination address.

24. The method of claim 17, wherein the spreader is built in the switch.

* * * * *

UNITED STATES PATENT AND TRADEMARK OFFICE
CERTIFICATE OF CORRECTION

| | | |
|---|---|---|
| PATENT NO. | : 7,539,124 B2 | Page 1 of 1 |
| APPLICATION NO. | : 10/998571 | |
| DATED | : May 26, 2009 | |
| INVENTOR(S) | : Sang-woo Rhim et al. | |

It is certified that error appears in the above-identified patent and that said Letters Patent is hereby corrected as shown below:

Column 9, Line 18, change "ports," to --port,--.

Column 10, Line 33, after "switch" insert --;--.

Signed and Sealed this

Seventeenth Day of November, 2009

David J. Kappos
*Director of the United States Patent and Trademark Office*